(12) United States Patent
Peng et al.

(10) Patent No.: US 12,307,199 B2
(45) Date of Patent: May 20, 2025

(54) SENTIMENT PARSING METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Minlong Peng, Beijing (CN); Mingming Sun, Beijing (CN); Ping Li, Sunnyvale, CA (US)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 434 days.

(21) Appl. No.: 17/942,116

(22) Filed: Sep. 10, 2022

(65) Prior Publication Data
US 2023/0274088 A1  Aug. 31, 2023

(30) Foreign Application Priority Data

Feb. 25, 2022 (CN) .......................... 202210179198.9

(51) Int. Cl.
*G06F 40/30* (2020.01)
*G06F 40/211* (2020.01)
(Continued)

(52) U.S. Cl.
CPC .......... *G06F 40/211* (2020.01); *G06F 40/253* (2020.01); *G06F 40/284* (2020.01); *G06F 40/295* (2020.01); *G06F 40/30* (2020.01); *G06F 40/268* (2020.01); *G06F 40/279* (2020.01); *G06F 40/289* (2020.01)

(58) Field of Classification Search
None
See application file for complete search history.

(56) References Cited

U.S. PATENT DOCUMENTS 8,856,056 B2 * 10/2014 Di Sciullo ............. G06Q 10/04
706/45
10,089,296 B2 * 10/2018 Zeichner ............... G06F 40/211
(Continued)

FOREIGN PATENT DOCUMENTS

CN     109376293 A  *  2/2019
CN     110232181 A     9/2019
(Continued)

OTHER PUBLICATIONS

Translation of CN113792542A (Year: 2021).*
(Continued)

*Primary Examiner* — Richard Z Zhu
(74) *Attorney, Agent, or Firm* — Brooks Kushman P.C.

(57) ABSTRACT

There is provided a sentiment parsing method and apparatus, an electronic device, and a storage medium, which relates to the technical field of artificial intelligence such as machine learning and natural language processing. A specific implementation solution involves: identifying a role of a sentiment parsing object in a specified statement; trimming the specified statement based on the role of the sentiment parsing object to acquire pruning result information after the trimming; and parsing sentiment of the sentiment parsing object in the specified statement based on the pruning result information.

12 Claims, 5 Drawing Sheets

(51) Int. Cl.
    *G06F 40/253*     (2020.01)
    *G06F 40/284*     (2020.01)
    *G06F 40/295*     (2020.01)
    *G06F 40/268*     (2020.01)
    *G06F 40/279*     (2020.01)
    *G06F 40/289*     (2020.01)

(56) References Cited

U.S. PATENT DOCUMENTS

| | | | | |
|---|---|---|---|---|
| 2012/0246104 | A1* | 9/2012 | Di Sciullo | G06Q 10/04 706/46 |
| 2014/0136323 | A1* | 5/2014 | Zhang | G06Q 30/0255 705/14.53 |
| 2017/0192955 | A1* | 7/2017 | Zeichner | G06F 16/335 |
| 2021/0158206 | A1* | 5/2021 | Klein | G06F 40/30 |

FOREIGN PATENT DOCUMENTS

| | | |
|---|---|---|
| CN | 110852095 A | 2/2020 |
| CN | 113434682 A | 9/2021 |
| CN | 113792542 A * | 12/2021 |
| WO | 2021/262408 A1 | 12/2021 |

OTHER PUBLICATIONS

Translation of CN109376293A (Year: 2019).*
Chen, F. et al., "Convolution Tree Kernel Based Sentiment Element Recognition Approach for Chinese Microblog," Computer Science, vol. 41, No. 12, Dec. 2014, 8 pages, DOI: 10.11896/j.issn.1002-137X.2014.12.028.
Rao, Y. et al. "Building emotional dictionary for sentiment analysis of online news," World Wide Web, vol. 17, 2014, pp. 723-742, DOI: 10.1007/s11280-013-0221-9.

* cited by examiner

SENTIMENT PARSING METHOD, ELECTRONIC DEVICE, AND STORAGE MEDIUM

CROSS-REFERENCE TO RELATED APPLICATIONS

The present application claims the priority of Chinese Patent Application No. 202210179198.9, filed on Feb. 25, 2022, with the title of "SENTIMENT PARSING METHOD AND APPARATUS, ELECTRONIC DEVICE, AND STORAGE MEDIUM." The disclosure of the above application is incorporated herein by reference in its entirety.

FIELD OF THE DISCLOSURE

The present disclosure relates to the technical field of computers, specifically to the technical field of artificial intelligence such as machine learning and natural language processing, and particularly to a sentiment parsing method, an electronic device, and a storage medium.

BACKGROUND OF THE DISCLOSURE

Sentiment parsing is devoted to parsing sentimental tendency of things involved in text, which has a wide and important application in social public opinion parsing.

An existing sentiment parsing system mainly uses a neural network model to model input text. Then, sentiment parsing is performed based on a representation obtained from modeling. For example, in order to improve generalization capability of the model, a large-scale pre-trained model may be introduced first. Then, the pre-trained model is trained with training text labeled with sentiment categories, so that the neural network model can learn the capability of sentiment parsing.

SUMMARY OF THE DISCLOSURE

The present disclosure provides a sentiment parsing method, an electronic device, and a storage medium.

According to one aspect of the present disclosure, a sentiment parsing method is provided, including identifying a role of a sentiment parsing object in a specified statement; trimming the specified statement based on the role of the sentiment parsing object to acquire pruning result information after the trimming; and parsing sentiment of the sentiment parsing object in the specified statement based on the pruning result information.

According to another aspect of the present disclosure, an electronic device is provided, including at least one processor; and a memory communicatively connected with the at least one processor; wherein the memory stores instructions executable by the at least one processor, and the instructions are executed by the at least one processor to enable the at least one processor to perform a sentiment parsing method, wherein the sentiment parsing method includes identifying a role of a sentiment parsing object in a specified statement; trimming the specified statement based on the role of the sentiment parsing object to acquire pruning result information after the trimming; and parsing sentiment of the sentiment parsing object in the specified statement based on the pruning result information.

According to yet another aspect of the present disclosure, there is provided a non-transitory computer readable storage medium with computer instructions stored thereon, wherein the computer instructions are used for causing a sentiment parsing method, wherein the sentiment parsing method includes identifying a role of a sentiment parsing object in a specified statement; trimming the specified statement based on the role of the sentiment parsing object to acquire pruning result information after the trimming; and parsing sentiment of the sentiment parsing object in the specified statement based on the pruning result information.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Obviously, the embodiments described are some of rather than all of the embodiments of the present disclosure. All other embodiments acquired by those of ordinary skill in the art without creative efforts based on the embodiments of the present disclosure fall within the protection scope of the present disclosure.

It is to be noted that the terminal device involved in the embodiments of the present disclosure may include, but is not limited to, smart devices such as mobile phones, personal digital assistants (PDAs), wireless handheld devices, and tablet computers. The display device may include, but is not limited to, devices with a display function such as personal computers and televisions.

In addition, the term "and/or" herein is merely an association relationship describing associated objects, indicating that three relationships may exist. For example, A and/or B indicates that there are three cases of A alone, A and B together, and B alone. Besides, the character "/" herein generally means that associated objects before and after it are in an "or" relationship.

With the development of technological levels, especially the development of a deep learning technology in recent years, models are more and more capable of modeling long-distance dependence of text. Enhancement of model capability not only improves a system effect, but also introduces more serious overfitting problems and possibilities, making the model more sensitive to noise and more vulnerable to contrived countermeasures. Therefore, existing sentiment parsing methods are sensitive to noise.

Figure 1:
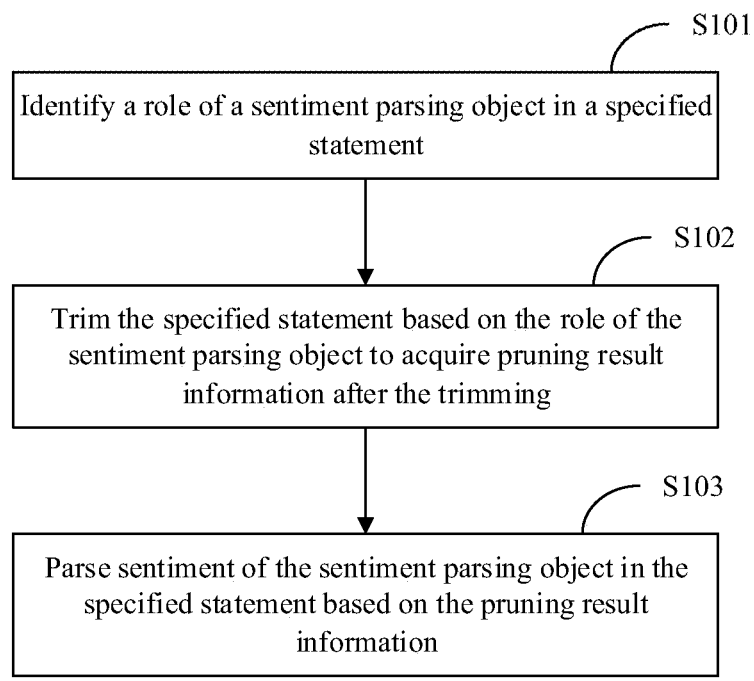
FIG. 1 is a schematic diagram according to a first embodiment of the present disclosure.

FIG. 1 is a schematic diagram according to a first embodiment of the present disclosure. As shown in FIG. 1, this embodiment provides a sentiment parsing method, which may be applied to any sentiment parsing apparatus and may specifically include the following steps.

In S101, a role of a sentiment parsing object in a specified statement is identified.

In S102, the specified statement is trimmed based on the role of the sentiment parsing object to acquire pruning result information after the trimming.

In S103, sentiment of the sentiment parsing object in the specified statement is parsed based on the pruning result information.

The sentiment parsing apparatus in this embodiment may be any electronic entity, or software integrated applications or plug-ins running on a variety of terminals when used.

Sentiment parsing in this embodiment is used to parse sentiment of a sentiment parsing object in a sentence. For example, for any specified statement, sentiment of any sentiment parsing object in the specified statement may be requested to be parsed.

It is to be noted that the sentiment parsing object in the specified statement in this embodiment may be specified by a user, or specified by other apparatuses with sentiment requirements. For example, when doing research, the user may select a sentiment parsing object for each specified statement to parse sentiment of the sentiment parsing object in the specified statement. Alternatively, a pre-trained sentiment parsing object selection model may be used to select a sentiment parsing object from a specified statement to parse sentiment of the sentiment parsing object in the specified statement.

In this embodiment, the role of the sentiment parsing object identified in the specified statement refers to a role that the sentiment parsing object plays in the specified statement.

Further, in this embodiment, the specified statement is required to be trimmed based on the role of the sentiment parsing object to remove noise irrelevant to the sentiment parsing object in the specified statement, preventing the influence of noise on the sentiment parsing, and finally acquire pruning result information after the trimming.

For example, the trimming in this embodiment may include trimming off information irrelevant to the sentiment parsing object from the specified statement based on the role of the sentiment parsing object. Alternatively, the trimming may include extracting information relevant to the sentiment parsing object from the specified statement based on the role of the sentiment parsing object. No matter which manner is adopted, a pruning effect can be achieved and pruning result information after the trimming can be acquired. The pruning result information in this embodiment may also be understood as simplified information relevant to the role of the sentiment parsing object in the specified statement. The simplified information does not include any other irrelevant noise.

According to the sentiment parsing method in this embodiment, a specified statement is trimmed based on a role of a sentiment parsing object to acquire pruning result information after the trimming, and sentiment of the sentiment parsing object in the specified statement is parsed based on the pruning result information. Since all noise information irrelevant to the role of the sentiment parsing object is removed from the pruning result information, the influence of noise on a parsing result can be reduced in the parsing of the sentiment of the sentiment parsing object in the specified statement, which can effectively improve accuracy of sentiment parsing on the sentiment parsing object in the specified statement and can effectively improve robustness of the sentiment parsing.

Figure 2:
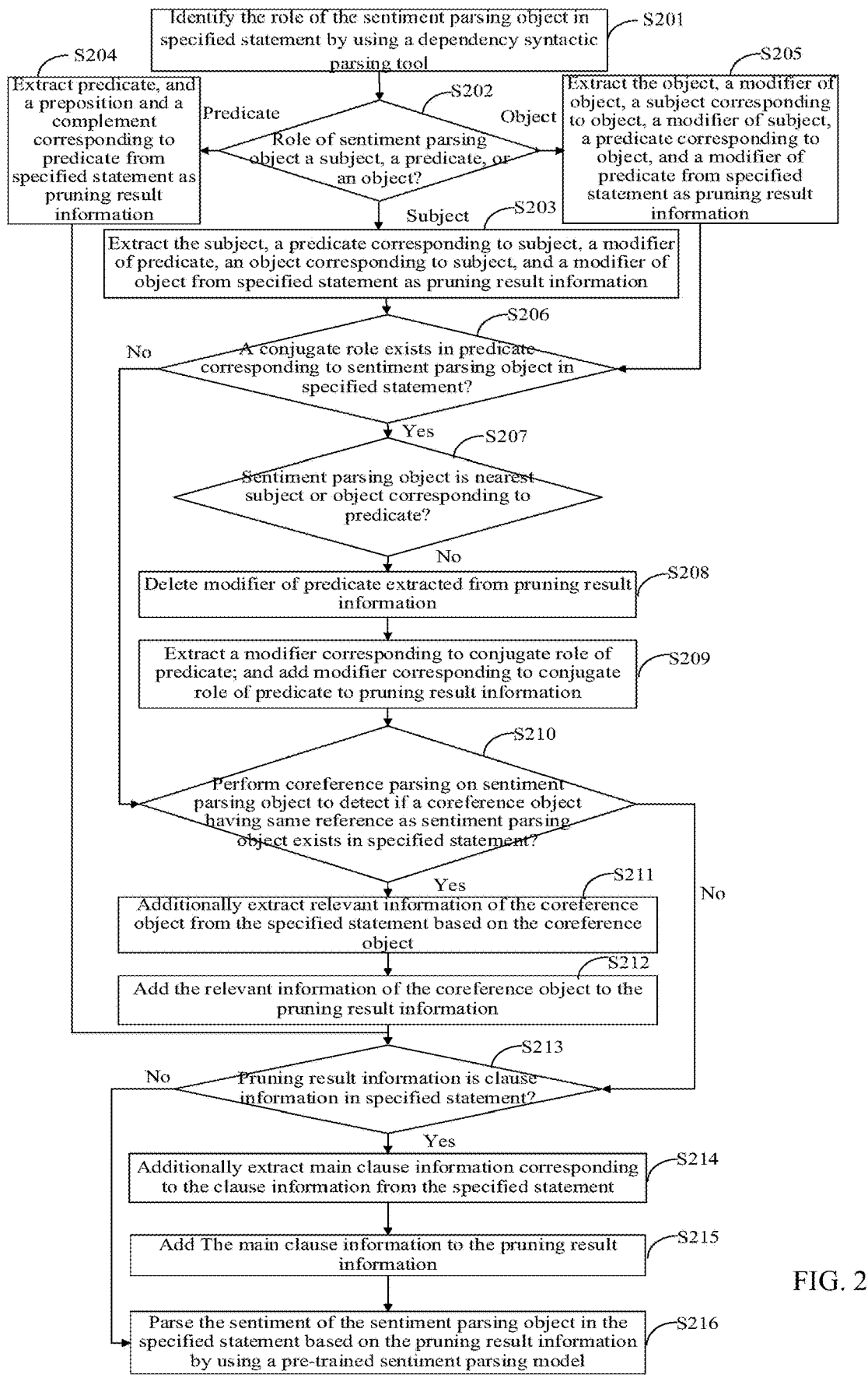
FIG. 2 is a schematic diagram according to a second embodiment of the present disclosure.

FIG. 2 is a schematic diagram according to a second embodiment of the present disclosure. As shown in FIG. 2, a sentiment parsing method in this embodiment further describes the technical solution of the present disclosure in more detail on the basis of the technical solution in the embodiment shown in FIG. 1. As shown in FIG. 2, the sentiment parsing method in this embodiment may specifically include the following steps.

In S201, the role of the sentiment parsing object in the specified statement is identified by using a dependency syntactic parsing tool.

In this embodiment, the sentiment of the sentiment parsing object in the specified statement is parsed, while the sentiment parsing object generally plays a role of a subject or an object in the statement, or occasionally plays a role of a predicate. For example, an object "work" in "work well" serves as a predicate in the statement. No sentiment exists in other roles in the statement, so the sentiment parsing object is generally not the other roles. However, in practical applications, if the sentiment parsing object is incorrectly labeled, the sentiment parsing object is another role in the specified statement. Certainly, sentiment parsing may also be performed thereon according to the process in this embodiment, but a final sentiment parsing result may be biased to a label of no sentiment.

Based on dependency syntactic parsing, a subject may generally be identified as a nominal subject (nsubj); or identified as a passive nominal subject (nsubjpass); or identified as a clausal subject (csubj); or identified as a passive clausal subject (csubjpass). An object may generally be identified as a direct object (dobj); or identified as an object of preposition (pobj); or identified as an object (obj); or identified as an attribute (attr). A predicate may generally be identified as a verb.

Figure 3:
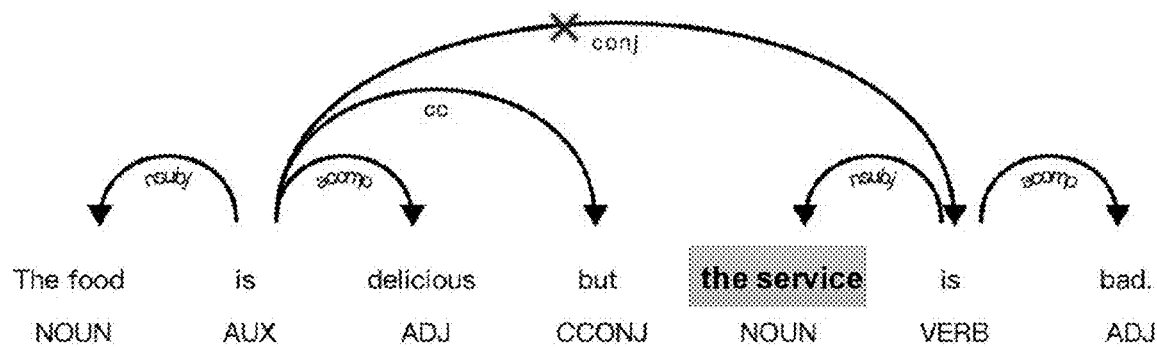
FIG. 3 shows an example of a specified statement according to the present disclosure.

For example, FIG. 3 shows an example of a specified statement according to the present disclosure. As shown in FIG. 3, for example, the specified statement is "The food is delicious but the service is bad", and a role of each word in the specified statement is parsed by using a dependency syntactic parsing tool. Role labeling results are shown in FIG. 3. If the specified sentiment parsing object is "the service", the role may be identified as a subject.

Step S201 is an implementation of step S101 in the embodiment shown in FIG. 1. In this way, the role of the sentiment parsing object can be determined accurately.

Optionally, in one embodiment of the present disclosure, the role of the sentiment parsing object in the specified statement may also be identified by using a pre-trained role identification model.

The role identification model may be modeled based on dependency syntactic parsing. Prior to use, the role identification model may be trained by using a large number of training statements labeled with roles of words, so that the role identification model can learn the capability of identifying each role in the statement. The role of the sentiment parsing object in the specified statement can be accurately identified by using the role identification model.

In S202, it is detected whether the role of the sentiment parsing object is a subject, a predicate, or an object. If the role is a subject, step S203 is performed. If the role is a predicate, step S204 is performed. If the role is an object, step S205 is performed.

In S203, the subject, a predicate corresponding to the subject, a modifier of the predicate, an object corresponding to the subject, and a modifier of the object are extracted from the specified statement as the pruning result information. Step S206 is performed.

If the role of the sentiment parsing object is a subject, it is to be noted that one subject may have more than one predicate and object in some cases. For example, in a sentence "My phone is quite old but still works well.", the subject "phone" has two predicates, i.e., "is" and "works". In this case, each predicate corresponding to the subject and a modifier of the predicate are required to be extracted.

In S204, the predicate, and a preposition and a complement corresponding to the predicate are extracted from the specified statement as the pruning result information. Step S213 is performed.

For example, taking "It is of high quality, has a killer GUI, easy to use." as an example, if the sentiment parsing object is "use", which is a predicate in the statement, "It is easy to use." may be extracted as the pruning result information based on the above extraction strategy.

In S205, the object, a modifier of the object, a subject corresponding to the object, a modifier of the subject, a predicate corresponding to the object, and a modifier of the predicate are extracted from the specified statement as the pruning result information. Step S206 is performed.

If the role of the sentiment parsing object is an object, it is to be noted that one object can have one predicate, but in some cases, more than one subject may be allowed. In this case, each subject corresponding to the object and a modifier of the subject are required to be extracted.

Steps S203 to S205 are corresponding pruning strategies when the role of the sentiment parsing object is a subject, a predicate, or an object respectively, and corresponding pruning result information may be acquired respectively based on the pruning strategies.

Specifically, in order to extract relevant content in the pruning result information, a syntactic parsing tree may be first established based on the role of the sentiment parsing object and roles of other words in dependency syntactic parsing results. Then, the strategies in steps S203 to S205 are further adopted to extract the sentiment parsing object and relevant information of the sentiment parsing object.

For example, when the sentiment parsing object is a subject, an adjective and a verb corresponding to the subject are first extracted from a node of the sentiment parsing object in the syntactic parsing tree. Then, an adverb corresponding to the adjective and an adverb and an object corresponding to the verb are extracted. After that, an adjective of the object and an adverb of the adjective are extracted. It is easy to find from the above description that the extraction process is actually a breadth-first traversal process. In short, all information relevant to the sentiment parsing object should be extracted. Roles relevant to each given role are given in Table 1 below. In the breadth-first traversal process, relevant roles adjacent to each given role are required to be extracted into a relevant queue, and all information extracted from the relevant queue is the pruning result information. The given role includes not only the role of the sentiment parsing object, but also relevant roles traversed based on the role of the sentiment parsing object.

TABLE 1

| Given role | Relevant role |
| --- | --- |
| subject | adjective, verb, preposition, conjunction |
| adjective | adverbial, negation (not), conjunction |
| verb | subject, object, preposition, adverbial negation, adjectival complement, noun phrase as adverbial modifier, conjunction |
| preposition | preposition, verb |
| object | adjective, verb, preposition, conjunction |

In S206, it is detected whether a conjugate role exists in the predicate corresponding to the sentiment parsing object in the specified statement. If yes, step S207 is performed. If no, step S210 is performed.

In S207, it is detected whether the sentiment parsing object is the nearest subject or object corresponding to the predicate. If no, step S208 is performed. If yes, it is determined that the information extracted from the pruning result information is correct and is not required to be modified. Step S210 is performed.

In S208, the modifier of the predicate extracted from the pruning result information is deleted. Step S209 is performed.

In S209, a modifier corresponding to the conjugate role of the predicate is extracted; and the modifier corresponding to the conjugate role of the predicate is added to the pruning result information. Step S210 is performed.

Steps S206 to S209 involve updating the pruning result information when the sentiment parsing object is a subject or an object and it is detected that a conjugate role exists in the predicate corresponding to the sentiment parsing object.

Due to the existence of the conjugate role "conjunction", a predicate irrelevant to the sentiment parsing object may be incorrectly extracted sometimes in the above method. A sentence "The food is delicious but the service is bad." is taken as an example. A predicate related to the sentiment parsing object "the service" is only the second "is". However, since the first "is" and the second "is" are conjugated in the syntactic parsing tree, the first "is" may also be extracted with the above method, resulting in errors in extraction of the relevant content. In this case, there is a need to use steps S206 to S209 to update the pruning result information, which can effectively ensure accuracy of the pruning result information.

The manner in step S207 may be reverse acknowledgment. In this embodiment, by introducing a reverse acknowledgment manner of predicates, the pruning result information may be re-acknowledged and updated in time in the case of incorrect extraction. Specifically, the nearest subject or object corresponding to each predicate is identified in the reverse acknowledgment manner. If the parsing object is not the nearest subject or object of the predicate, the verb and content associated therewith should not be extracted from the pruning result information. In this case, if the predicate and relevant information have been extracted from the pruning result information, the predicate and relevant information are deleted, and relevant information of the predicate of the conjugate role is re-extracted. For example, still taking the sentence "The food is delicious but the service is bad." as an example, when the sentiment parsing object is the first "service", by reverse acknowledgment, the nearest subject of the first "is" is "food" instead of "service", and the subject "food" corresponding to the first "is" should not be extracted from the pruning result information, but the subject "service" corresponding to the second "is" should be extracted.

In the implementation, the parsing on the conjugate role in steps S206 to S209 is subsequent to step S203 and step S206.

Optionally, in this embodiment, the process of parsing the conjugate role may also be prior to step S203 and step S206. In this case, correspondingly, when it is detected whether the role of the sentiment parsing object is a subject or an object in step S202, the following steps may be included.

(1) It is detected whether a conjugate role exists in the predicate corresponding to the sentiment parsing object in the specified statement. If yes, step (2) is performed. If no, step S203 or S205 is directly performed based on the role corresponding to the sentiment parsing object.

(2) The predicate of the sentiment parsing object is identified by reverse acknowledgment based on the sentiment parsing object. Step (3) is performed.

(3) The predicate of the sentiment parsing object is marked.

For example, the reverse acknowledgment manner in this embodiment is to detect the subject or object of which one of the predicates of the two conjugate roles is the sentiment parsing object, and then the predicate is the predicate of the sentiment parsing object. In this embodiment, the predicate of the sentiment parsing object may be marked, so that the predicate of the sentiment parsing object and a modifier corresponding to the predicate can be accurately extracted in the case of extraction. In this manner, the accuracy of the pruning result information can also be effectively ensured.

In S210, coreference parsing is performed on the sentiment parsing object, and it is detected whether a coreference object having the same reference as the sentiment parsing object exists in the specified statement. If yes, step S211 is performed. If no, step S213 is performed.

In S211, relevant information of the coreference object is additionally extracted from the specified statement based on the coreference object. Step S212 is performed.

In S212, the relevant information of the coreference object is added to the pruning result information. Step S213 is performed.

In practical applications, the sentiment parsing object may appear in many parts in a sentence in different forms, while a given form of the sentiment parsing object is fixed. In this case, failure to identify such different forms of expressions for objects may result in loss of the pruning result information. For example, in a specified sentence "I buy the computer just last month, it does not work now.", the sentiment parsing object is "computer". In the specified sentence, "it" and "computer" describe a same object. In this case, if this point cannot be correctly identified, only "I buy the computer just last month." may be extracted as pruning result information, and the important content "it does not work now" is lost.

Based on this, a coreference parsing process of steps S210 to S212 is introduced in this embodiment. Specifically, when the sentiment parsing object is a subject or an object, the coreference parsing process is required to be performed to identify a coreference object having the same reference as the sentiment parsing object. Relevant information of the coreference object is extracted correspondingly in a manner the same as the manner of extracting relevant information of the sentiment parsing object. If the coreference object is a subject, relevant information corresponding to the coreference object may be extracted according to step S203. If the coreference object is an object, the relevant information of the coreference object may be extracted according to step S205. Finally, the relevant information of the sentiment parsing object and the relevant information of the coreference object form the pruning result information together.

In steps S210 to S212, for example, the coreference parsing process is subsequent to step S203 and step S205. In practical applications, steps S210 to S212 may also be subsequent to step S202. When the sentiment parsing object is determined as a subject or an object, steps S210 to S212 are performed simultaneously, or performed prior to step S203 and step S205, which is not limited herein.

In S213, it is detected whether the pruning result information is clause information in the specified statement. If yes, step S214 is performed. If no, step S216 is performed.

In S214, main clause information corresponding to the clause information is additionally extracted from the specified statement. Step S215 is performed.

In S215, the main clause information is added to the pruning result information. Step S216 is performed.

Steps S213 to S215 are definitely performed after the acquisition of the pruning result information. Specifically, the sentiment parsing object is sometimes part of a clause rather than part of a main clause in sentiment parsing. In this case, only content of the clause rather than content of the main clause may be extracted according to the above extraction manner in this embodiment.

Figure 4:
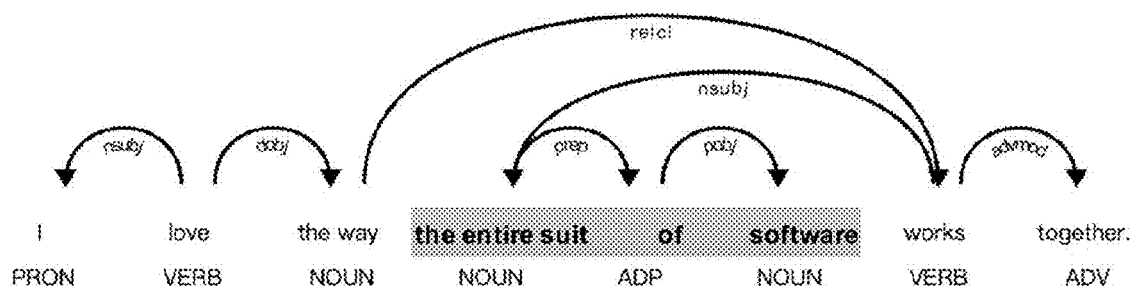
FIG. 4 shows an example of another specified statement according to the present disclosure.

For example, FIG. 4 shows an example of another specified statement according to the present disclosure. As shown in FIG. 4, when the sentiment parsing object is "the entire suit of software", "the entire suit of software" is a main clause of a clause "the entire suit of software works together.", and only the clause may be extracted according to the above extraction method. This is obviously inadequate and unreasonable. In this case, in this embodiment, there is a need to further extract the main clause corresponding to the sentiment parsing object. To this end, in this embodiment, it is proposed to further identify and extract the corresponding main clause information. Specifically, it is found by parsing the syntactic parsing tree that the clause is a complement of the object "the way" of the main clause, indicating that it is a clause, and "the way" and relevant content thereof can be further extracted. That is, main clause information corresponding to the clause is extracted.

Based on the processing of the above steps, very simplified pruning result information relative to the specified statement can be obtained. For example, Table 2 below is an example of an original statement and a pruning result statement, in which bold font is the corresponding sentiment parsing object.

TABLE 2

| Original statement | Pruning result information |
|---|---|
| I was highly disappointed in the food. | I was highly disappointed in the food. |
| Ray's boathouse is deserving of its title as a seattle institution. | Ray's boathouse is deserving. |

TABLE 2-continued

| Original statement | Pruning result information |
|---|---|
| Great food but the service was dreadful; horribly quick meals. | Great food. |
| It has great sushi and even better service. | It has even better service. |
| I love the way the entire suit of software works together. | I love the entire suit of software works together. |
| however, it's the service that leaves a bad taste in my mouth. | it's the service that leaves a bad taste. |
| I like all the goods, including the phone. | I like, including the phone. |

It can be intuitively seen from Table 2 above that the pruning scheme of this embodiment can effectively remove redundant information for sentiment parsing on the sentiment parsing object in the sentence.

In S216, the sentiment of the sentiment parsing object in the specified statement is parsed based on the pruning result information by using a pre-trained sentiment parsing model.

In this embodiment, the pruning result information obtained by pruning in the above step is inputted to the pre-trained sentiment parsing model. In this case, compared with the original specified statement, much noise has been removed from the pruning result information, which can reduce the influence of noise on sentiment parsing on a specified object. In this case, the sentiment parsing model can accurately predict the sentiment of the sentiment parsing object in the specified statement based on the inputted pruning result information. Moreover, when the sentiment parsing model is used for sentiment parsing, accuracy of the sentiment parsing can be improved, and intelligence of the sentiment parsing can also be improved.

The sentiment parsing model in this embodiment may be a binary-classification or multi-class classification model. Specifically, the model is determined according to the number of classes of classification set by the sentiment parsing model during draining. For example, in the case of binary classification, corresponding sentiment classifications may be set as positive and passive, indicating positive and optimistic sentiment and negative and pessimistic sentiment respectively. In the case of three-class classification or multi-class classification, emotions may be divided into three or more levels, which indicate different levels of emotions.

During the training of the sentiment parsing model, the sentiment parsing model may be trained by using a plurality of training samples. Each training sample includes a training statement, a training object specified in the training statement, and a sentiment category of the training object in the training statement. When the sentiment parsing model is trained by using a plurality of training samples, the sentiment parsing model can learn the capability of sentiment parsing.

The sentiment parsing model in this embodiment may be a neural network model of a long short-term memory (LSTM) structure or a transformer structure.

According to the sentiment parsing method in this embodiment, based on the different situations in which the sentiment parsing object is a subject, a predicate, or an object, corresponding pruning strategies can be adopted to accurately acquire the pruning result information, so as to effectively remove noise irrelevant to the sentiment parsing object in the specified statement. Moreover, sentiment of the sentiment parsing object in the specified statement can be accurately predicted further based on the pruning result information and the pre-trained sentiment parsing model. The technical solution of this embodiment can effectively improve the accuracy of the sentiment parsing on the sentiment parsing object. Moreover, since the pruning result information is obtained by pruning, noise is effectively removed, which reduces the influence of the noise on the sentiment parsing and can further effectively improve the robustness of the entire sentiment parsing scheme.

Further, in this embodiment, when the sentiment parsing object is a subject or an object, if a conjugate role exists in the predicate of the sentiment parsing object, reverse acknowledgment may be further adopted to update the pruning result information, which can effectively ensure accuracy of the pruning result information, thereby further effectively improving the accuracy of the sentiment parsing on the sentiment parsing object.

Further, in this embodiment, when the sentiment parsing object is a subject or an object, coreference parsing is further required, and when a coreference object exists in the sentiment parsing object, relevant information of the coreference object is further extracted and added to the pruning result information, which can further ensure comprehensiveness and accuracy of the pruning result information. Then, the accuracy of the sentiment parsing on the sentiment parsing object can be further effectively improved.

Further, in this embodiment, when the pruning result information is clause information in the specified statement, corresponding main clause information may be further extracted, which can also further ensure the comprehensiveness and accuracy of the pruning result information. Then, the accuracy of the sentiment parsing on the sentiment parsing object can be further effectively improved.

In the present disclosure, an effect of the sentiment parsing on the sentiment parsing object can also be verified based on the pruning result information after pruning in the present disclosure. Specifically, tests can be performed on a plurality of typical data sets to test the performance of the solution of the present disclosure.

For example, the following is parsing on the performance of the solution of the present disclosure against three typical attacks RevTgt, RevNon, and AddDiff. RevTgt imposes countermeasures by reversing sentiment polarity of the sentiment parsing object. RevNon imposes countermeasures by reversing sentiment polarity of non-sentiment parsing objects. AddDiff imposes countermeasures by introducing content inconsistent with sentiment of the parsing object. Table 3 below is introduction to the three attacks and corresponding examples, in which bold font in the examples is the sentiment parsing object.

TABLE 3

| Attack | Interpretation | Example |
|---|---|---|
| RevTgt | Reverse sentiment polarity of the sentiment parsing object | The food was tasty and the wine was excellent. →The food was tasteless but the wine was excellent. |

TABLE 3-continued

| Attack | Interpretation | Example |
| --- | --- | --- |
| RevNon | Reverse sentiment polarity of non-sentiment parsing objects | The food was tasty and the wine was excellent. →The food was tasty but the wine was bad. |
| AddDiff | Introduce content inconsistent with the sentiment parsing object | The food was tasty. → The food was tasty but the wine was bad |

In the tests of the present disclosure, neural network models based on an LSTM structure and a transformer structure are tested. The former uses a pre-trained bag-of-words model, i.e., a Glove model, and the latter uses a pre-trained language model, i.e., a BERT model. Each model is tested under four settings: Origin, TrimOrigin, Attack, and TrimAttack.

Under the Origin setting, the model is trained and tested on an original training data set and a test data set. Under the TrimOrigin setting, the model is trained and tested on a training data set and a test data set after the pruning scheme of the present disclosure is used for trimming. Under the Attack setting, the model is first trained on an original training data set and then tested on a test data set after attack. Under the TrimAttack setting, the model is trained and tested on a training data set and a test data set that are trimmed and attacked.

Figure 5:
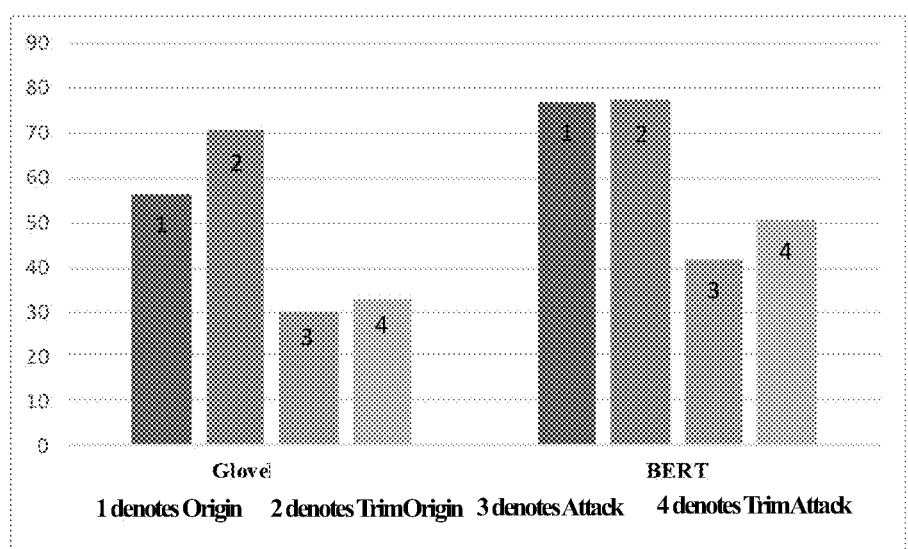
FIG. 5 is a schematic diagram of evaluation of model against RevTgt attack under four settings according to the present disclosure.
Figure 6:
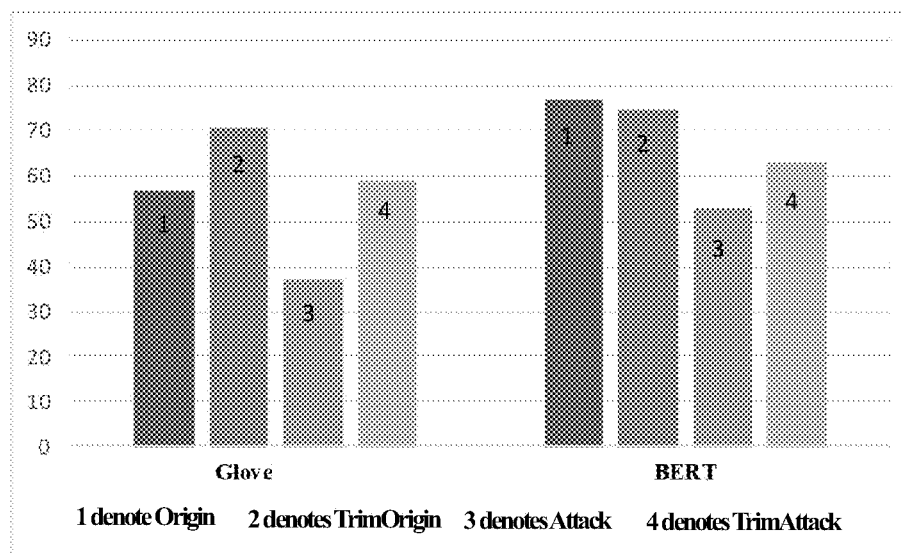
FIG. 6 is a schematic diagram of evaluation of model against RevNon attack under four settings according to the present disclosure.
Figure 7:
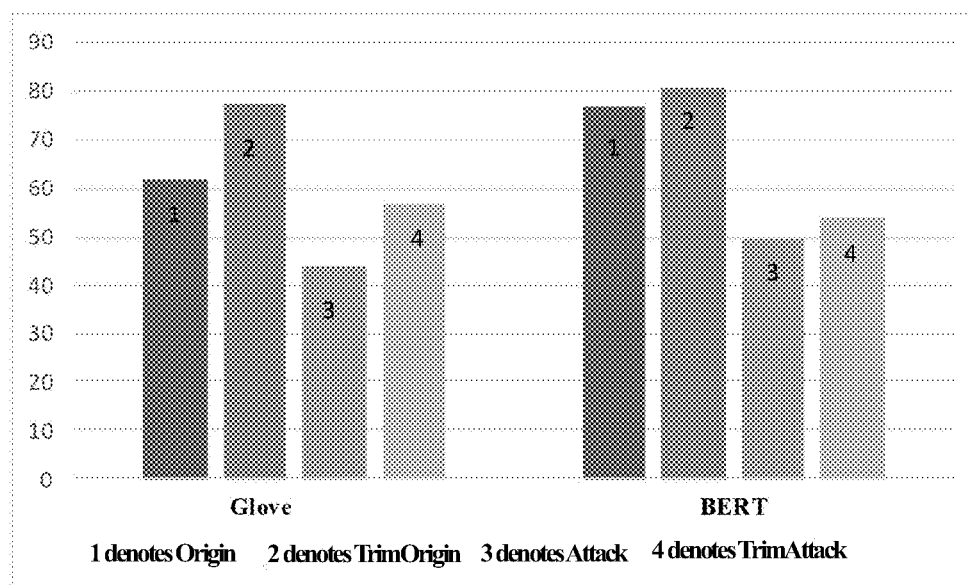
FIG. 7 is a schematic diagram of evaluation of model against AddDiff attack under four settings according to the present disclosure.

Further, the system is evaluated using macro averaging (Macro-F1). For the index, a higher value indicates better system performance. FIG. 5 is a schematic diagram of evaluation of model against RevTgt attack under four settings according to the present disclosure. FIG. 6 is a schematic diagram of evaluation of model against RevNon attack under four settings according to the present disclosure. FIG. 7 is a schematic diagram of evaluation of model against RevNon attack under four settings according to the present disclosure. Ordinates in FIG. 5, FIG. 6, and FIG. 7 are values of Macro-F1.

According to the results shown in FIG. 5, FIG. 6, and FIG. 7, the following content can be known.

1. The performance of the model under the Attack setting is much worse than that under the Origin setting. This reflects vulnerability of the model in the face of the three attacks, and also illustrates the importance of robust sentiment parsing.
2. In many cases, the performance of the model under the TrimOrigin setting is better than that under the Origin setting, which may indicate that the sentence pruning technology in the present disclosure can even improve generalization capability of the model on conventional samples. Correspondingly, it may be interpreted as follows. Sentence pruning enables the model to focus more on parsing object related information while eliminating irrelevant information, so as to reduce the overfitting of the model to the training data set.
3. The performance of the model under the TrimOrigin setting is better than that under the Attack setting, which may indicate that the sentence pruning technology in the present disclosure can effectively improve the robustness of the model in the face of the three attacks.

Figure 8:
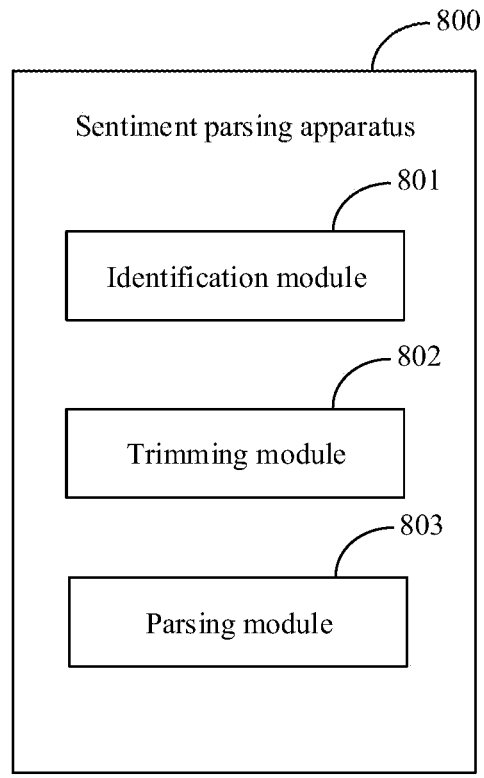
FIG. 8 is a schematic diagram according to a third embodiment of the present disclosure.

FIG. 8 is a schematic diagram according to a third embodiment of the present disclosure. As shown in FIG. 8, this embodiment provides a sentiment parsing apparatus 800, including:

an identification module 801 configured to identify a role of a sentiment parsing object in a specified statement;

a trimming module 802 configured to trim the specified statement based on the role of the sentiment parsing object to acquire pruning result information after the trimming; and a parsing module 803 configured to parse sentiment of the sentiment parsing object in the specified statement based on the pruning result information.

An implementation principle and a technical effect of the sentiment parsing apparatus 800 in this embodiment realizing sentiment parsing by using the above modules are the same as those in the above related method embodiment. Details may be obtained with reference to the description in the above related embodiment, and are not described herein.

Optionally, in one embodiment of the present disclosure, the trimming module 802 is configured to extract, if the role of the sentiment parsing object is a subject, the subject, a predicate corresponding to the subject, a modifier of the predicate, an object corresponding to the subject, and a modifier of the object from the specified statement as the pruning result information; extract, if the role of the sentiment parsing object is an object, the object, a modifier of the object, a subject corresponding to the object, a modifier of the subject, a predicate corresponding to the object, and a modifier of the predicate from the specified statement as the pruning result information; or extract, if the role of the sentiment parsing object is a predicate, the predicate, and a preposition and a complement corresponding to the predicate from the specified statement as the pruning result information.

Optionally, in one embodiment of the present disclosure, the trimming module 802 is further configured to detect, if the role of the sentiment parsing object is a subject or an object, whether a conjugate role exists in the predicate corresponding to the sentiment parsing object in the specified statement; detect, if yes, whether the sentiment parsing object is the nearest subject or object corresponding to the predicate; delete, if no, the modifier of the predicate extracted from the pruning result information; extract a modifier corresponding to the conjugate role of the predicate; and add the modifier corresponding to the conjugate role of the predicate to the pruning result information.

Optionally, in one embodiment of the present disclosure, the trimming module 802 is further configured to detect, if the role of the sentiment parsing object is a subject or an object, whether a conjugate role exists in the predicate corresponding to the sentiment parsing object in the specified statement; identify, if yes, the predicate of the sentiment parsing object by reverse acknowledgment based on the sentiment parsing object; and mark the predicate of the sentiment parsing object.

Optionally, in one embodiment of the present disclosure, the trimming module 802 is further configured to detect whether the pruning result information is clause information in the specified statement; additionally extract, if yes, main clause information corresponding to the clause information from the specified statement; and add the main clause information to the pruning result information.

Optionally, in one embodiment of the present disclosure, the trimming module 802 is further configured to perform, if the role of the sentiment parsing object is a subject or an object, coreference parsing on the sentiment parsing object, and detect whether a coreference object having the same reference as the sentiment parsing object exists in the specified statement; extract, if yes, relevant information of the coreference object from the specified statement based on the coreference object; and add the relevant information of the coreference object to the pruning result information.

Optionally, in one embodiment of the present disclosure, the identification module 801 is configured to identify the role of the sentiment parsing object in the specified statement by using a dependency syntactic parsing tool; or identify the role of the sentiment parsing object in the specified statement by using a pre-trained role identification model.

Optionally, in one embodiment of the present disclosure, the parsing module 803 is configured to parse the sentiment of the sentiment parsing object in the specified statement based on the pruning result information by using a pre-trained sentiment parsing model.

An implementation principle and a technical effect of the sentiment parsing apparatus 800 in this embodiment realizing sentiment parsing by using the above modules are the same as those in the above related method embodiment. Details may be obtained with reference to the description in the above related embodiment, and are not described herein.

Acquisition, storage, and application of users' personal information involved in the technical solutions of the present disclosure comply with relevant laws and regulations, and do not violate public order and moral.

According to embodiments of the present disclosure, the present disclosure further provides an electronic device, a readable storage medium, and a computer program product.

Figure 9:
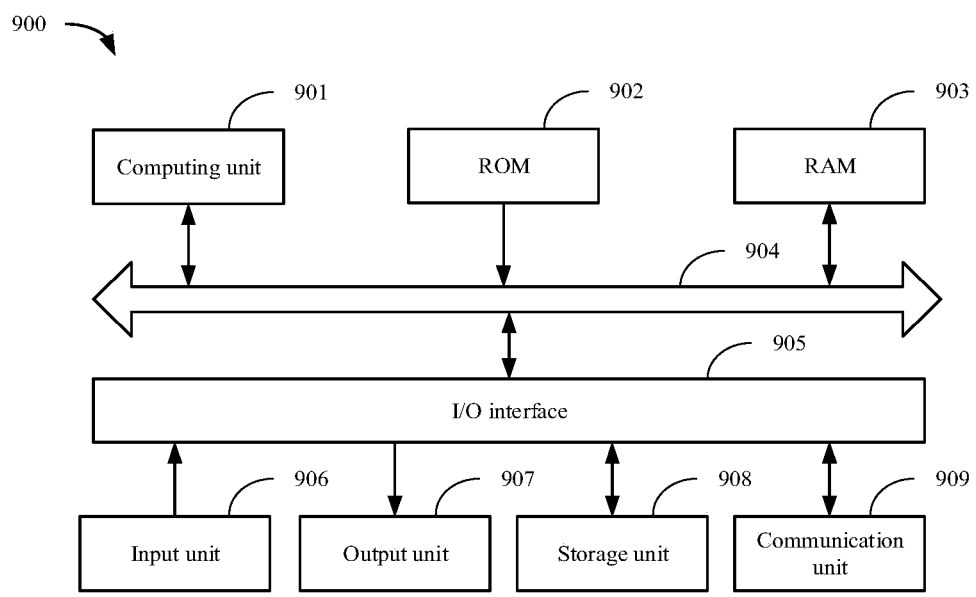
FIG. 9 is a block diagram of an electronic device configured to implement the method according to an embodiment of the present disclosure.

FIG. 9 is a schematic block diagram of an exemplary electronic device 900 configured to implement an embodiment of the present disclosure. The electronic device is intended to represent various forms of digital computers, such as laptops, desktops, workbenches, PDAs, servers, blade servers, mainframe computers and other suitable computers. The electronic device may further represent various forms of mobile devices, such as PDAs, cellular phones, smart phones, wearable devices and other similar computing devices. The components, their connections and relationships, and their functions shown herein are examples only, and are not intended to limit the implementation of the present disclosure as described and/or required herein.

As shown in FIG. 9, the device 900 includes a computing unit 901, which may perform various suitable actions and processing according to a computer program stored in a read-only memory (ROM) 902 or a computer program loaded from a storage unit 908 into a random access memory (RAM) 903. The RAM 903 may also store various programs and data required to operate the device 900. The computing unit 901, the ROM 902 and the RAM 903 are connected to one another by a bus 904. An input/output (I/O) interface 905 is also connected to the bus 904.

A plurality of components in the device 900 are connected to the I/O interface 905, including an input unit 906, such as a keyboard and a mouse; an output unit 907, such as various displays and speakers; a storage unit 908, such as disks and discs; and a communication unit 909, such as a network card, a modem and a wireless communication transceiver. The communication unit 909 allows the device 900 to exchange information/data with other devices over computer networks such as the Internet and/or various telecommunications networks.

The computing unit 901 may be a variety of general-purpose and/or special-purpose processing components with processing and computing capabilities. Some examples of the computing unit 901 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 901 performs the methods and processing described above, such as the method in the present disclosure. For example, in some embodiments, the method in the present disclosure may be implemented as a computer software program that is tangibly embodied in a machine-readable medium, such as the storage unit 908. In some embodiments, part or all of a computer program may be loaded and/or installed on the device 900 via the ROM 902 and/or the communication unit 909. One or more steps of the method in the present disclosure described above may be performed when the computer program is loaded into the RAM 903 and executed by the computing unit 901. Alternatively, in other embodiments, the computing unit 901 may be configured to perform the method in the present disclosure by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A computer-implemented sentiment parsing method, comprising:
   selecting a sentiment parsing object from a specified statement;[1]
   identifying a role of the sentiment parsing object in the specified statement;
   trimming the specified statement based on the role of the sentiment parsing object to remove noise irrelevant to the sentiment parsing object in the specified statement to acquire pruning result information after the trimming, wherein the pruning result information is simplified information relevant to the role of the sentiment parsing object in the specified statement which does not include any other irrelevant noise; and
   inputting the pruning result information into a pre-trained sentiment parsing model for parsing sentiment of the sentiment parsing object in the specified statement wherein the pre-trained sentiment parsing model is a neural network model that classifies the pruning result information into a plurality of levels of emotions,[2]
   wherein the trimming the specified statement based on the role of the sentiment parsing object to acquire pruning result information after the trimming comprises:
   extracting, if the role of the sentiment parsing object is a subject, the subject, a predicate corresponding to the subject, a modifier of the predicate, an object corresponding to the subject, and a modifier of the object from the specified statement as the pruning result information;
   extracting, if the role of the sentiment parsing object is an object, the object, a modifier of the object, a subject corresponding to the object, a modifier of the subject, a predicate corresponding to the object, and a modifier of the predicate from the specified statement as the pruning result information; or
   extracting, if the role of the sentiment parsing object is a predicate, the predicate, and a preposition and a complement corresponding to the predicate from the specified statement as the pruning result information,
   wherein the role of the sentiment parsing object is a subject or an object, the subject, a predicate corresponding to the subject, a modifier of the predicate, an object corresponding to the subject, and a modifier of the object from the specified statement as the pruning result information, or the predicate, and a preposition and a complement corresponding to the predicate from the specified statement as the pruning result information,
   after the extracting, the method further comprises:
   detecting whether a conjugate role exists in the predicate corresponding to the sentiment parsing object in the specified statement;
   detecting, if yes, whether the sentiment parsing object is the nearest subject or object corresponding to the predicate;
   deleting, if no, the modifier of the predicate extracted from the pruning result information;
   extracting a modifier corresponding to the conjugate role of the predicate; and
   adding the modifier corresponding to the conjugate role of the predicate to the pruning result information, and
   prior to the extracting, the method further comprises:
   detecting whether a conjugate role exists in the predicate corresponding to the sentiment parsing object in the specified statement;
   identifying, if yes, the predicate of the sentiment parsing object by reverse acknowledgment based on the sentiment parsing object; and
   marking the predicate of the sentiment parsing object, and the method further comprises:
   detecting whether the pruning result information is clause information in the specified statement;

additionally extracting, if yes, main clause information corresponding to the clause information from the specified statement; and adding the main clause information to the pruning result information.

2. The method of claim 1, wherein, if the role of the sentiment parsing object is a subject or an object, the method further comprises:

performing coreference parsing on the sentiment parsing object, and detecting whether a coreference object having the same reference as the sentiment parsing object exists in the specified statement;

extracting, if yes, relevant information of the coreference object from the specified statement based on the coreference object; and adding the relevant information of the coreference object to the pruning result information.

3. The method of claim 1, wherein the identifying a role of a sentiment parsing object in a specified statement comprises:

identifying the role of the sentiment parsing object in the specified statement by using a dependency syntactic parsing tool; or identifying the role of the sentiment parsing object in the specified statement by using a pre-trained role identification model.

4. The method of claim 1, wherein the parsing sentiment of the sentiment parsing object in the specified statement based on the pruning result information comprises:

parsing the sentiment of the sentiment parsing object in the specified statement based on the pruning result information by using a pre-trained sentiment parsing model.

5. The method of claim 1, wherein the identifying a role of a sentiment parsing object in a specified statement comprises:

identifying the role of the sentiment parsing object in the specified statement by using a dependency syntactic parsing tool; or identifying the role of the sentiment parsing object in the specified statement by using a pre-trained role identification model.

6. The method of claim 1, wherein the parsing sentiment of the sentiment parsing object in the specified statement based on the pruning result information comprises:

parsing the sentiment of the sentiment parsing object in the specified statement based on the pruning result information by using a pre-trained sentiment parsing model.

7. An electronic device, comprising:

at least one processor; and a memory communicatively connected with the at least one processor;

wherein the memory stores instructions executable by the at least one processor, and the instructions are executed by the at least one processor to enable the at least one processor to perform a sentiment parsing method, wherein the sentiment parsing method comprises:

selecting a sentiment parsing object from a specified statement;[3]

identifying a role of the sentiment parsing object in the specified statement;

trimming the specified statement based on the role of the sentiment parsing object to remove noise irrelevant to the sentiment parsing object in the specified statement to acquire pruning result information after the trimming, wherein the pruning result information is simplified information relevant to the role of the sentiment parsing object in the specified statement which does not include any other irrelevant noise; and inputting the pruning result information into a pre-trained sentiment parsing model for parsing sentiment of the sentiment parsing object in the specified statement wherein the pre-trained sentiment parsing model is a neural network model that classifies the pruning result information into a plurality of levels of emotions,[4]

wherein the trimming the specified statement based on the role of the sentiment parsing object to acquire pruning result information after the trimming comprises:

extracting, if the role of the sentiment parsing object is a subject, the subject, a predicate corresponding to the subject, a modifier of the predicate, an object corresponding to the subject, and a modifier of the object from the specified statement as the pruning result information;

extracting, if the role of the sentiment parsing object is an object, the object, a modifier of the object, a subject corresponding to the object, a modifier of the subject, a predicate corresponding to the object, and a modifier of the predicate from the specified statement as the pruning result information; or extracting, if the role of the sentiment parsing object is a predicate, the predicate, and a preposition and a complement corresponding to the predicate from the specified statement as the pruning result information, wherein the role of the sentiment parsing object is a subject or an object, the subject, a predicate corresponding to the subject, a modifier of the predicate, an object corresponding to the subject, and a modifier of the object from the specified statement as the pruning result information, or the predicate, and a preposition and a complement corresponding to the predicate from the specified statement as the pruning result information, after the extracting, the method further comprises:

detecting whether a conjugate role exists in the predicate corresponding to the sentiment parsing object in the specified statement;

detecting, if yes, whether the sentiment parsing object is the nearest subject or object corresponding to the predicate;

deleting, if no, the modifier of the predicate extracted from the pruning result information;

extracting a modifier corresponding to the conjugate role of the predicate; and adding the modifier corresponding to the conjugate role of the predicate to the pruning result information, and prior to the extracting, the method further comprises:

detecting whether a conjugate role exists in the predicate corresponding to the sentiment parsing object in the specified statement;

identifying, if yes, the predicate of the sentiment parsing object by reverse acknowledgment based on the sentiment parsing object; and marking the predicate of the sentiment parsing object, and the method further comprises:

detecting whether the pruning result information is clause information in the specified statement;

additionally extracting, if yes, main clause information corresponding to the clause information from the specified statement; and adding the main clause information to the pruning result information.

8. The electronic device of claim 7, wherein, if the role of the sentiment parsing object is a subject or an object, the method further comprises:
   performing, coreference parsing on the sentiment parsing object, and detecting whether a coreference object having the same reference as the sentiment parsing object exists in the specified statement;
   extracting, if yes, relevant information of the coreference object from the specified statement based on the coreference object; and
   adding the relevant information of the coreference object to the pruning result information.

9. The electronic device of claim 7, wherein the identifying a role of a sentiment parsing object in a specified statement comprises:
   identifying the role of the sentiment parsing object in the specified statement by using a dependency syntactic parsing tool; or
   identifying the role of the sentiment parsing object in the specified statement by using a pre-trained role identification model.

10. The electronic device of claim 7, wherein the parsing sentiment of the sentiment parsing object in the specified statement based on the pruning result information comprises:
    parsing the sentiment of the sentiment parsing object in the specified statement based on the pruning result information by using a pre-trained sentiment parsing model.

11. The electronic device of claim 7, wherein the identifying a role of a sentiment parsing object in a specified statement comprises:
    identifying the role of the sentiment parsing object in the specified statement by using a dependency syntactic parsing tool; or
    identifying the role of the sentiment parsing object in the specified statement by using a pre-trained role identification model.

12. A non-transitory computer readable storage medium with computer instructions stored thereon, wherein the computer instructions are used for causing a sentiment parsing method, wherein the sentiment parsing method comprises:
    selecting a sentiment parsing object from a specified statement;
    identifying a role of a sentiment parsing object in a specified statement;
    trimming the specified statement based on the role of the sentiment parsing object to remove noise irrelevant to the sentiment parsing object in the specified statement to acquire pruning result information after the trimming, wherein the pruning result information is simplified information relevant to the role of the sentiment parsing object in the specified statement which does not include any other irrelevant noise; and
    inputting the pruning result information into a pre-trained sentiment parsing model for parsing sentiment of the sentiment parsing object in the specified statement wherein the pre-trained sentiment parsing model is a neural network model that classifies the pruning result information into a plurality of levels of emotions, wherein the trimming the specified statement based on the role of the sentiment parsing object to acquire pruning result information after the trimming comprises:
extracting, if the role of the sentiment parsing object is a subject, the subject, a predicate corresponding to the subject, a modifier of the predicate, an object corresponding to the subject, and a modifier of the object from the specified statement as the pruning result information;
extracting, if the role of the sentiment parsing object is an object, the object, a modifier of the object, a subject corresponding to the object, a modifier of the subject, a predicate corresponding to the object, and a modifier of the predicate from the specified statement as the pruning result information; or
extracting, if the role of the sentiment parsing object is a predicate, the predicate, and a preposition and a complement corresponding to the predicate from the specified statement as the pruning result information,
wherein the role of the sentiment parsing object is a subject or an object, the subject, a predicate corresponding to the subject, a modifier of the predicate, an object corresponding to the subject, and a modifier of the object from the specified statement as the pruning result information, or the predicate, and a preposition and a complement corresponding to the predicate from the specified statement as the pruning result information,
after the extracting, the method further comprises:
detecting whether a conjugate role exists in the predicate corresponding to the sentiment parsing object in the specified statement;
detecting, if yes, whether the sentiment parsing object is the nearest subject or object corresponding to the predicate;
deleting, if no, the modifier of the predicate extracted from the pruning result information;
extracting a modifier corresponding to the conjugate role of the predicate; and
adding the modifier corresponding to the conjugate role of the predicate to the pruning result information, and
prior to the extracting, the method further comprises:
detecting whether a conjugate role exists in the predicate corresponding to the sentiment parsing object in the specified statement;
identifying, if yes, the predicate of the sentiment parsing object by reverse acknowledgment based on the sentiment parsing object; and
marking the predicate of the sentiment parsing object, and
the method further comprises:
detecting whether the pruning result information is clause information in the specified statement;
additionally extracting, if yes, main clause information corresponding to the clause information from the specified statement; and
adding the main clause information to the pruning result information.

* * * * *